(12) United States Patent
Brain

(10) Patent No.: US 12,130,612 B2
(45) Date of Patent: Oct. 29, 2024

(54) BANDWIDTH ADJUSTMENT FOR REMOTE CONTROL OF A MANUFACTURING TOOL

(71) Applicant: KLA Corporation, Milpitas, CA (US)

(72) Inventor: Michael Brain, Los Gatos, CA (US)

(73) Assignee: KLA Corporation, Milpitas, CA (US)

( * ) Notice: Subject to any disclaimer, the term of this patent is extended or adjusted under 35 U.S.C. 154(b) by 10 days.

(21) Appl. No.: 17/867,476

(22) Filed: Jul. 18, 2022

(65) Prior Publication Data

US 2023/0100138 A1    Mar. 30, 2023

Related U.S. Application Data

(60) Provisional application No. 63/249,599, filed on Sep. 29, 2021.

(51) Int. Cl.
| | |
|---|---|
| *G06F 15/16* | (2006.01) |
| *G05B 19/418* | (2006.01) |
| *H04L 67/025* | (2022.01) |
| *H04L 67/12* | (2022.01) |

(52) U.S. Cl.
CPC ........ *G05B 19/4185* (2013.01); *H04L 67/025* (2013.01); *H04L 67/12* (2013.01)

(58) Field of Classification Search
CPC .... G05B 19/4185; H04L 67/025; H04L 67/12
See application file for complete search history.

(56) References Cited

U.S. PATENT DOCUMENTS

| | | | |
|---|---|---|---|
| 8,510,476 | B2 | 8/2013 | Eastvold |
| 10,200,725 | B2* | 2/2019 | Tatourian ............... G09G 5/391 |
| 2013/0219012 | A1 | 8/2013 | Suresh et al. |
| 2014/0365620 | A1* | 12/2014 | Lindberg ................ H04L 65/60 |
| | | | 709/219 |
| 2015/0074749 | A1* | 3/2015 | Vasko ................ G05B 19/4185 |
| | | | 726/1 |
| 2016/0142769 | A1 | 5/2016 | Spracklen et al. |
| 2017/0353765 | A1 | 12/2017 | Frusina et al. |
| 2020/0042682 | A1 | 2/2020 | Johnson et al. |
| 2021/0194991 | A1* | 6/2021 | Rickeby ............... H04N 19/164 |

OTHER PUBLICATIONS

Beyondtrust, "Secure Remote Access," https://www.beyondtrust.com/secure-remote-access (downloaded Jul. 7, 2022).

(Continued)

*Primary Examiner* — Normin Abedin
(74) *Attorney, Agent, or Firm* — Huse IP Law

(57) ABSTRACT

A method is performed at a computer system of a manufacturing tool in a manufacturing facility. The method includes sending a series of frames showing data for the manufacturing tool to a client device for display. The client device is remote from the manufacturing facility. The method further includes receiving, from the client device, an indication of a user interaction with the client device and, in response to the indication, adjusting a bandwidth for one or more frames of the series of frames. Sending the series of frames includes, after receiving the indication, transmitting the one or more frames to the client device for display. The one or more frames are transmitted with the adjusted bandwidth.

11 Claims, 11 Drawing Sheets

(56) References Cited

OTHER PUBLICATIONS

D. Mitchell, "Netop Remote Control 12.2 review," IT Pro, Feb. 25, 2016, https://www.itpro.co.uk/desktop-software/26104/netop-remote-control-122-review.
Famatech Corp., "Radmin: Reliable Remote Desktop Software for IT Pros, " https://www.radmin.com/ (downloaded Jul. 7, 2022).
Impero Connect, "Remote Access Software," https://www.imperosoftware.com/impero-connect/ (downloaded Jul. 7, 2022).
Logmein, "Easy Computer Desktop Control & Remote Access," https://www.logmein.com/pro/features/remote-access# (downloaded Jul. 7, 2022).
Teamviewer, "Now, not Later. Here, not There. Problem? Solved! This is TeamViewer," https://www.teamviewer.com/en-us/products/teamviewer/ (downloaded Jul. 7, 2022).
Wikipedia, "Remote Desktop Protocol," https://en.wikipedia.org/wiki/Remote_Desktop_Prolocol (downloaded Jul. 7, 2022).
Wikipedia, "Virtual Network Computing," https://en.wikipedia.org/wiki/Virtual_Network_Computing (downloaded Jul. 7, 2022).
Internet Engineering Task Force (IETF), RFC 7159, "The JavaScript Object Notation (JSON) Data Interchange Format," Mar. 2014, https://datatracker.ietf.org/doc/html/rfc7159.
PCT/US2022/044955, International Search Report, Jan. 20, 2023.
PCT/US2022/044955, Written Opinion of the International Searching Authority, Jan. 20, 2023.

\* cited by examiner

BANDWIDTH ADJUSTMENT FOR REMOTE CONTROL OF A MANUFACTURING TOOL

RELATED APPLICATION

This application claims priority to U.S. Provisional Patent Application No. 63/249,599, filed on Sep. 29, 2021, which is incorporated by reference in its entirety for all purposes.

TECHNICAL FIELD

This disclosure relates to transmitting data from a manufacturing tool in a manufacturing facility to a remote client device, and more specifically to adjusting the bandwidth (e.g., the resolution and/or frame rate) and providing security for such transmissions.

BACKGROUND

Manufacturing facilities include equipment (i.e., manufacturing tools) supplied by equipment suppliers. A manufacturing facility may desire to collaborate with an expert at an equipment supplier to get the expert's help regarding a manufacturing tool. It is desirable for this collaboration to be remote, so that the expert does not have to travel to the manufacturing facility. Remote collaboration is challenging, however, because of network delays. The mere fact that the expert is often far away (e.g., on the other side of the world) from the manufacturing facility results in a minimum unavoidable delay. Network-bandwidth limitations add additional delay, potentially to the point that remote collaboration can become impractical (e.g., even with the use of video compression). Remote collaboration also presents security risks. Computer security is a particularly sensitive issue for manufacturing facilities because they possess highly confidential information regarding products being manufactured and the fabrication processes used to manufacture the products.

SUMMARY

In some embodiments, a method is performed at a computer system of a manufacturing tool in a manufacturing facility. The method includes sending a series of frames showing data for the manufacturing tool to a client device for display. The client device is remote from the manufacturing facility. The method further includes receiving, from the client device, an indication of a user interaction with the client device and, in response to the indication, adjusting a bandwidth for one or more frames of the series of frames. Sending the series of frames includes, after receiving the indication, transmitting the one or more frames with the adjusted bandwidth to the client device for display.

In some embodiments, a non-transitory computer-readable storage medium stores one or more programs for execution by one or more processors of a computer system of a manufacturing tool. The one or more programs include instructions for sending a series of frames showing data for the manufacturing tool to a client device for display. The client device is remote from a manufacturing facility in which the manufacturing tool is to be disposed. The one or more programs further include instructions for adjusting a bandwidth for one or more frames of the series of frames in response to receiving from the client device an indication of a user interaction with the client device. The instructions for sending the series of frames include instructions for transmitting, after receipt of the indication, the one or more frames with the adjusted bandwidth to the client device for display.

In some embodiments, a manufacturing tool includes hardware to process or inspect products being fabricated and a computer system to control the hardware. The computer system includes one or more processors and memory storing one or more programs for execution by the one or more processors. The one or more programs include instructions for sending a series of frames showing data for the manufacturing tool to a client device for display. The client device is remote from a manufacturing facility in which the manufacturing tool is to be disposed. The one or more programs further include instructions for adjusting a bandwidth for one or more frames of the series of frames in response to receiving from the client device an indication of a user interaction with the client device. The instructions for sending the series of frames include instructions for transmitting, after receipt of the indication, the one or more frames with the adjusted bandwidth to the client device for display.

In some embodiments, a method is performed at a computer system of a manufacturing tool in a manufacturing facility. The computer system is communicatively coupled to a server associated with the manufacturing facility. The method includes assigning a descriptor to a series of frames showing data for the manufacturing tool, providing the descriptor to the server, and providing the series of frames to the server for forwarding to a client device remote from the manufacturing facility. The server forwards the series of frames to the client device in accordance with a decision, based at least in part on the descriptor, that the client device is authorized to receive the series of frames.

In some embodiments, a non-transitory computer-readable storage medium stores one or more programs for execution by one or more processors of a computer system of a manufacturing tool in a manufacturing facility. The computer system is communicatively coupled to a server associated with the manufacturing facility. The one or more programs include instructions for assigning a descriptor to a series of frames showing data for the manufacturing tool, instructions for providing the descriptor to the server, and instructions for providing the series of frames to the server for forwarding to a client device remote from the manufacturing facility. The server is to forward the series of frames to the client device in accordance with a decision, based at least in part on the descriptor, that the client device is authorized to receive the series of frames.

In some embodiments, a manufacturing tool includes hardware to process or inspect products being fabricated and a computer system to control the hardware. The computer system is to be communicatively coupled to a server associated with a manufacturing facility in which the manufacturing tool is disposed. The computer system includes one or more processors and memory storing one or more programs for execution by the one or more processors. The one or more programs include instructions for assigning a descriptor to a series of frames showing data for the manufacturing tool, instructions for providing the descriptor to the server, and instructions for providing the series of frames to the server for forwarding to a client device remote from the manufacturing facility. The server is to forward the series of frames to the client device in accordance with a decision, based at least in part on the descriptor, that the client device is authorized to receive the series of frames.

BRIEF DESCRIPTION OF THE DRAWINGS

For a better understanding of the various described embodiments, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
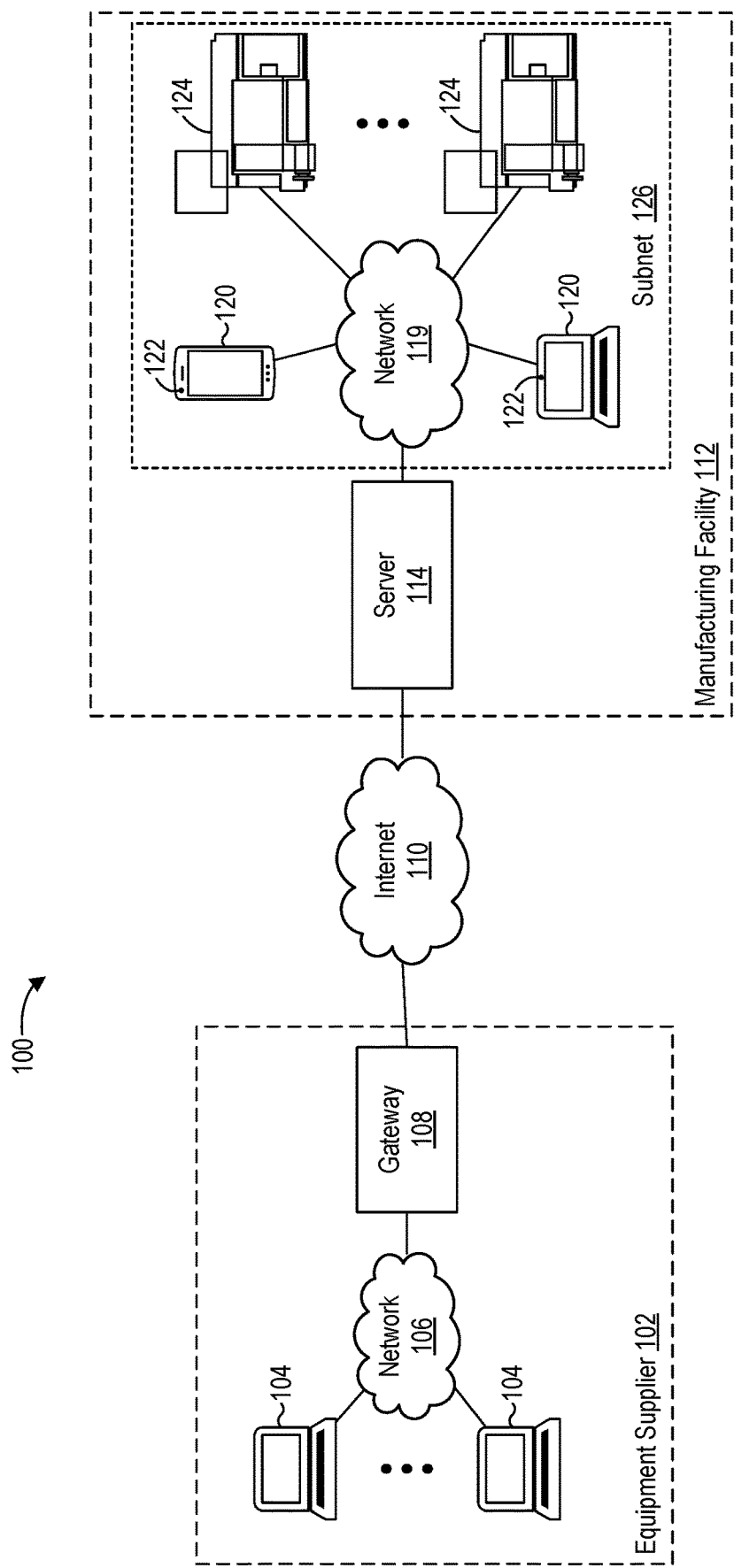
FIG. 1 shows a network architecture for electronic communication between manufacturing tools in a manufacturing facility and client devices of an equipment supplier, in accordance with some embodiments.

FIG. 1 shows a network architecture 100 for electronic communication between manufacturing tools 124 in a manufacturing facility 112 and client devices 104 of an equipment supplier 102, in accordance with some embodiments. The manufacturing tools 124 are items of manufacturing equipment (i.e., capital equipment) used for one or more manufacturing processes in the manufacturing facility 112. In some embodiments, the manufacturing facility 112 is a semiconductor fabrication facility (i.e., a "semiconductor fab" or simply a "fab") and the manufacturing tools 124 include semiconductor fabrication equipment and semiconductor inspection equipment used to fabricate and inspect semiconductor wafers. For example, a respective manufacturing tool 124 may be a semiconductor fabrication tool or a semiconductor inspection tool. In other embodiments, the manufacturing facility 112 is another type of factory with other manufacturing tools 124 for fabricating and/or inspecting products manufactured in the factory. The equipment supplier 102 supplies (e.g., designs, manufactures, sells, and/or supports) at least some of the manufacturing tools 124.

The manufacturing tools 124 in the manufacturing facility 112 are situated behind a server 114 (e.g., manufacturing-facility server 900, FIG. 9) associated with the manufacturing facility 112. In some embodiments, the server 114 is situated in the manufacturing facility 112. Alternatively, the server 114 may have a different location (e.g., while still being under the control of the organization that operates the manufacturing facility 112.) The server 114 acts as a gateway that provides computer security for the manufacturing facility 112. The manufacturing tools 124 are communicatively coupled with the server 114 through a network 119 that is internal to the manufacturing facility 112. For example, respective manufacturing tools 124 (e.g., manufacturing tools 800, FIG. 8) include respective computer systems (e.g., computer systems 801, FIG. 8) that control operation of the respective manufacturing tools 124 and report on the status of the respective manufacturing tools 124. These respective computer systems are communicatively coupled with the server 114 through the network 119. The manufacturing facility 112 also includes other electronic devices 120 (e.g., computers, mobile electronic devices, etc.) that are communicatively coupled with the server 114 through the network 119. The manufacturing tools 124 and electronic devices 120, as networked through the network 119, compose a subnet 126 that is internal to the manufacturing facility 112.

The manufacturing facility 112 may desire to remotely collaborate with the equipment supplier 102. For example, an engineer, technician, or operator at the manufacturing facility 112 may seek the help of an expert at the equipment supplier 102 regarding the installation, operation, servicing, and/or repair of one or more manufacturing tools 124 supplied by the equipment supplier 102. The expert may provide this help from a client device 104 (e.g., a computer) at the equipment supplier 102 or another location remote from the manufacturing facility 112 (e.g., at the expert's home). The expert uses the client device 104 to access the computer system of a manufacturing tool 124 and/or an electronic device 120 at the manufacturing facility 112. (The expert is thus the user of the client device 104). For example, the expert may access the computer system of the manufacturing tool 124 to check the status of the manufacturing tool 124, review data from the manufacturing tool 124, control operation of the manufacturing tool 124, write or modify a recipe for the manufacturing tool 124, view an image or video feed (e.g., from a camera 832, FIG. 8) showing a portion of the manufacturing tool 124 (e.g., to view operation of the manufacturing tool 124 or to check for mechanical issues with the manufacturing tool 124), and/or view an image of the product under process or test (e.g., to view status of the product to gauge performance of the manufacturing tool 124). An electronic device 120 may include a camera 122 that the expert seeks to access to videoconference with someone at the manufacturing facility 112 and/or to view the manufacturing tool 124. The camera 122 may provide an image or video feed for the expert to view. In some embodiments, an electronic device 120 may be a camera headset capable of providing live streaming for remotely viewing a manufacturing tool 124.

The client device 104 may be situated behind a gateway 108 at the equipment supplier 102 (or at another remote location). For example, the client device 104 is one of a plurality of client devices 104 at the equipment supplier 102 that are communicatively coupled to the gateway 108 through a network 106 that is internal to the equipment supplier 102. The gateway 108 communicates electronically with the server 114 through the Internet 110. Client devices 104 communicate electronically with manufacturing tools 124 through the network 106, the gateway 108, the Internet 110, the server 114, and the network 119, in accordance with some embodiments.

To allow remote collaboration, the computer system of a manufacturing tool 124 may send frames showing data for the manufacturing tool 124 to a remote client device 104. The frames may show a user interface (or portions thereof, such as a user-interface screens) for the manufacturing tool 124. Sending the frames to the remote client device 104 allows the data for the manufacturing tool 124 (e.g., the user interface or portions thereof) to be displayed on the client device 104. The expert at the client device 104 can use the user interface to send commands to the manufacturing tool 124 (e.g., as described below for FIGS. 2A and 2B). The computer system of the manufacturing tool 124 may adjust the bandwidth for frames (i.e., the bandwidth used to transmit the frames), as described below for the methods 300-600 (FIGS. 3-6). For example, the computer system of the manufacturing tool 124 may adjust the resolution used for frames and/or portions of frames, and/or may adjust the frame rate (e.g., frames per second). Adjusting the bandwidth for frames allows for timely transmission of frames from the computer system of the manufacturing tool 124 to the client device 104 (e.g., by reducing the resolution and/or frame rate), resulting in responsiveness that improves the user experience for the expert. The frame rate may be increased to improve video quality when desired by the expert. The resolution used for frames and/or portions of frames may be adjusted to provide higher resolution when desired by the expert. Post-processing by the gateway 108 can reduce choppiness that can result from reducing the frame rate.

Figure 7:
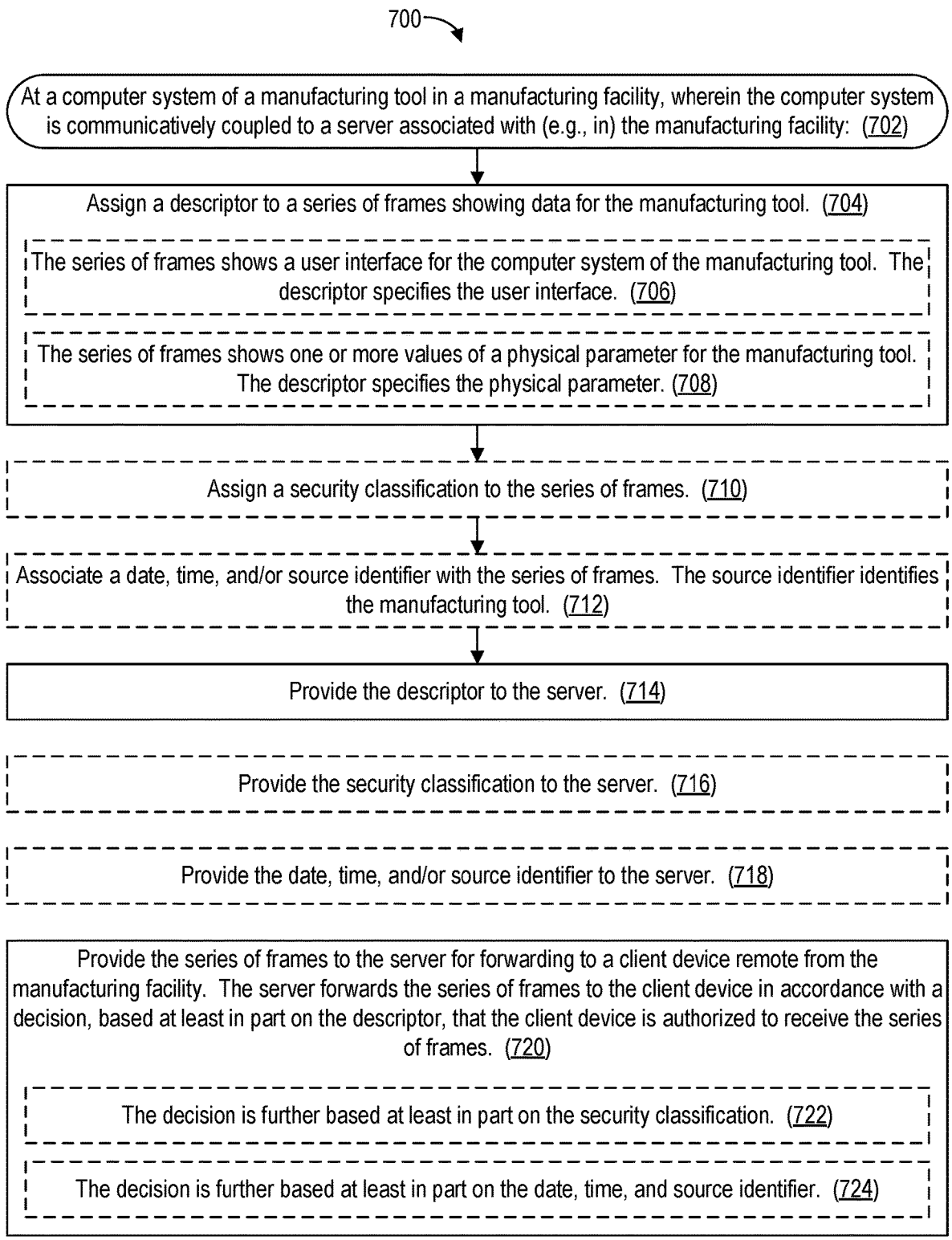
FIG. 7 is a flowchart showing a method for providing security for communications from a manufacturing tool to a client device, in accordance with some embodiments.

The manufacturing facility 112 seeks to maintain security while allowing remote collaboration with the equipment supplier 102, to protect secrets (e.g., intellectual property) held by the manufacturing facility 112. Such secrets include, for example, information about the design of products manufactured in the manufacturing facility 112 and information about the manufacturing process used to make the products. The equipment supplier 102 seeks to maintain security while providing equipment support, to protect secrets (e.g., intellectual property) held by the equipment supplier 102. Such secrets include, for example, information about the design of the manufacturing tool 124 provided by the equipment supplier 102 and proprietary service procedures for the manufacturing tool 124 provided by the equipment supplier 102. To provide security and protect these secrets, the server 114 may determine whether a particular client device 104 is authorized to receive certain frames from a particular manufacturing tool 124. The server 114 may make this determination based at least in part on information received from the manufacturing tool 124 (e.g., a descriptor for the frames, classifier for the frames, source identifier, date, and/or time), as described below for the method 700 (FIG. 7).

Figure 2A:
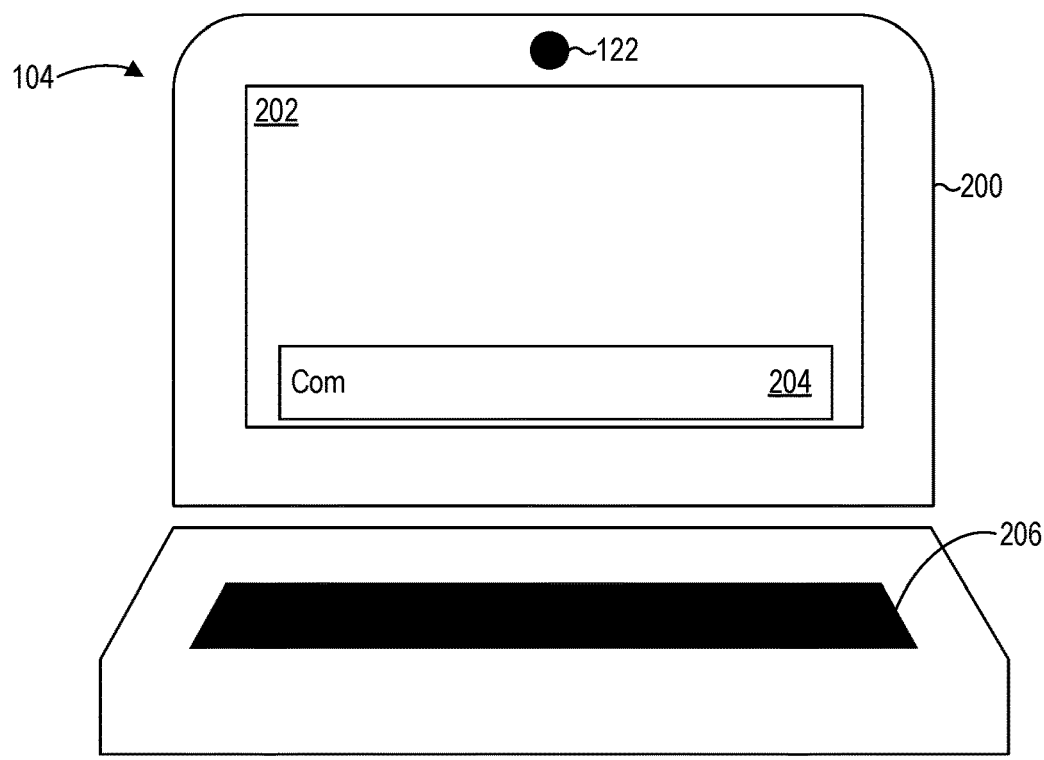
FIGS. 2A-2C show examples of a client device that is communicatively coupled with the computer system of a manufacturing tool for remote collaboration and that displays a graphical user interface for the manufacturing tool, in accordance with some embodiments.
Figure 2B:
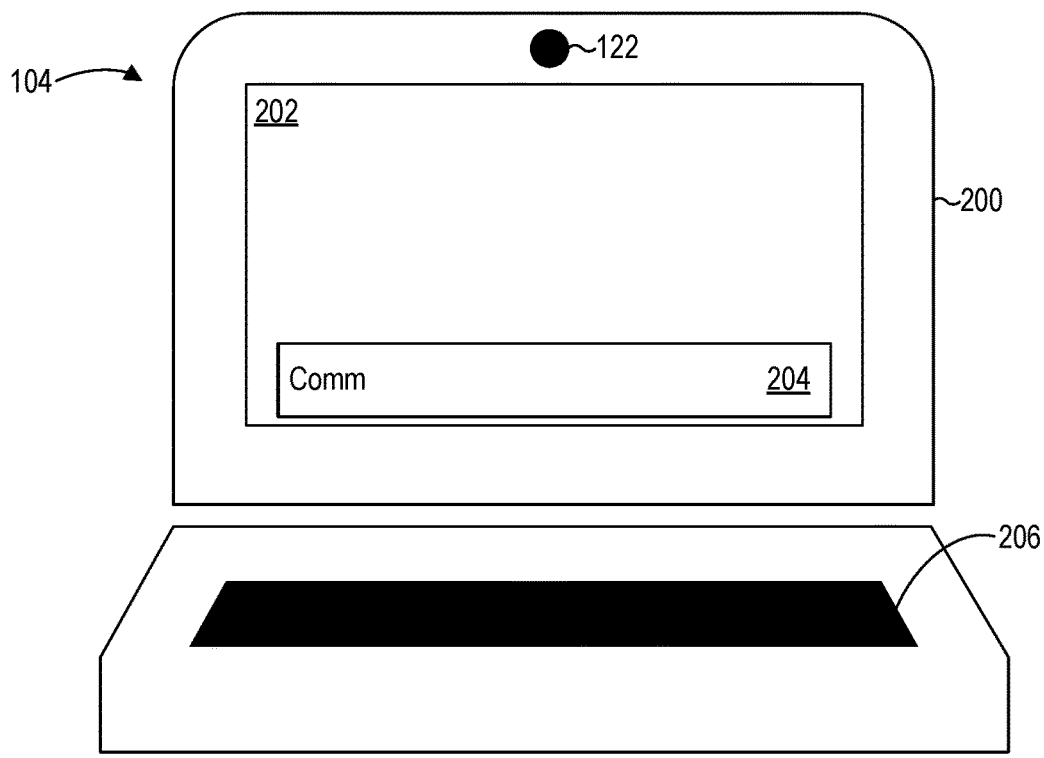
Figure 2C:
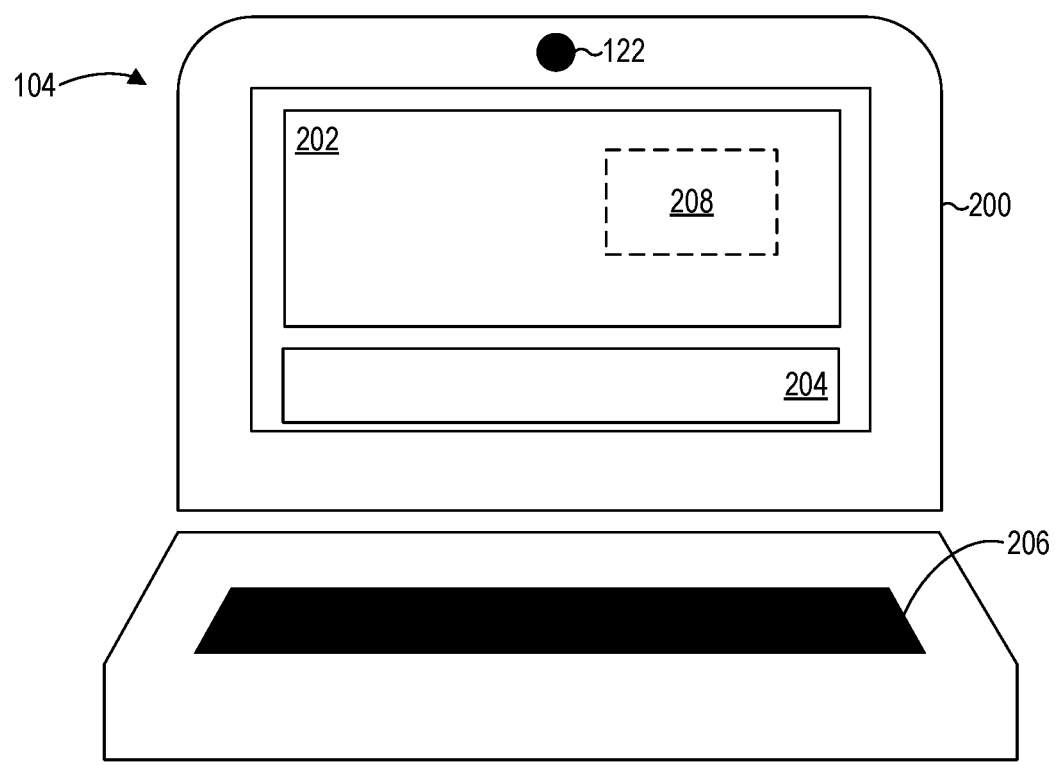

FIGS. 2A-2C show examples of a client device 104 that is communicatively coupled with the computer system of a manufacturing tool 124 for remote collaboration, in accordance with some embodiments. A display screen 200 of the client device 104 displays a graphical user interface (GUI) 202 for the manufacturing tool 124. The GUI 202 is provided in frames sent from the computer system of the manufacturing tool 124 to the client device 104. In the example of FIGS. 2A-2C, the GUI 202 occupies the entire display screen 200. Alternatively, the GUI 202 may be displayed within a window that occupies a portion of the display screen 200.

In some embodiments, the GUI 202 includes a command line 204 that the expert may use to send commands to the computer system of the manufacturing tool 124. In FIG. 2A, the expert has already typed the text "Com" (e.g., using the keyboard 206). This text has been sent from the client device 104 to the computer system of the manufacturing tool 124. In response, the computer system of the manufacturing tool 124 has sent a frame to the client device 104 showing "Com" in the command line 204. The expert then types a second "m" (e.g., using the keyboard 206). The client device 104 sends the second "m" to the computer system of the manufacturing tool 124. In response, the computer system of the manufacturing tool 124 sends a new frame to the client device 104. The new frame shows "Comm" in the command line 204, reflecting the typing of the second "m". The client device 104 displays the new frame in the display screen 200, thus updating the GUI 202. The expert may continue to enter text in the command line 204 (e.g., using the keyboard 206), with the GUI 202 being updated accordingly to display the new text: the client device 104 transmits the new text to the computer system of the manufacturing tool 124, which responds with new frames showing the new text in the command line 204. Alternatively, or in addition, user inputs may be provided in a different manner (e.g., in a different text-entry field than the command line 204 and/or by selecting one or more affordances in the GUI 202), with the GUI 202 being updated accordingly in response to the user inputs: the client device 104 transmits indications of the user inputs to the computer system of the manufacturing tool 124, which responds with new frames showing the user inputs and/or results of the user inputs. To allow the GUI 202 to be updated quickly in response to the user inputs, the resolution of frames (e.g., a predefined number of frames) sent by the computer system of the manufacturing tool 124 in response to receiving indications of the user inputs may be reduced (i.e., degraded). Degrading the resolution of the frames reduces the size of the frames, thus reducing the bandwidth for the frames and speeding transmission of the frames from the computer system of the manufacturing tool 124 to the client device 104. Speeding transmission of the frames to the client device 104 causes the GUI 202 promptly to reflect the results of user inputs (e.g., promptly to display newly entered text), resulting in a responsive feel for the expert. A lack of timely response to user input, on the other hand, creates a frustrating user experience for the expert, potentially to the point that remote collaboration becomes impractical.

More generally, the client device 104 may detect a user interaction (i.e., an interaction of the expert) with the client device 104. The user interaction may provide explicit user input (e.g., through the keyboard 206 and/or selection of an affordance in the GUI 202). Or the user interaction may detect behavior of the expert, while the expert views the GUI 202, that does not amount to explicit user input. The client device 104 may send an indication of this behavior to the computer system of the manufacturing tool 124 and receive one or more frames updating the GUI 202 (e.g., adjusting the resolution of all or a portion of the GUI 202) from the computer system of the manufacturing tool 124 in response. For example, looking at a particular area 208 (FIG. 2C) in the GUI 202 on the display screen 200 is a user interaction with the client device 104. The client device 104 may perform eye-tracking using a camera 122 to determine that the expert is looking at the area 208 in the GUI 202. The area 208 is an area in frames sent from the computer system of the manufacturing tool 124 to the client device 104, since the frames provide the GUI 202. The client device 104 sends an indication specifying the area 208 to the computer system of the manufacturing tool 124 and receives one or more frames updating the GUI 202 (e.g., increasing the resolution of the area 208 but not of the remainder of the GUI 202) from the computer system of the manufacturing tool 124 in response. Alternatively, the area 208 may be defined by an explicit user input (e.g., a click-and-drag operation using a mouse or other user-input device). In some embodiments, the area 208 is defined by aggregating information from multiple user inputs, including previously received user inputs. While the area 208 is shown as a rectangle in FIG. 2C, the area 208 may have a different shape (e.g., a circle or ellipse) instead.

Figure 3:
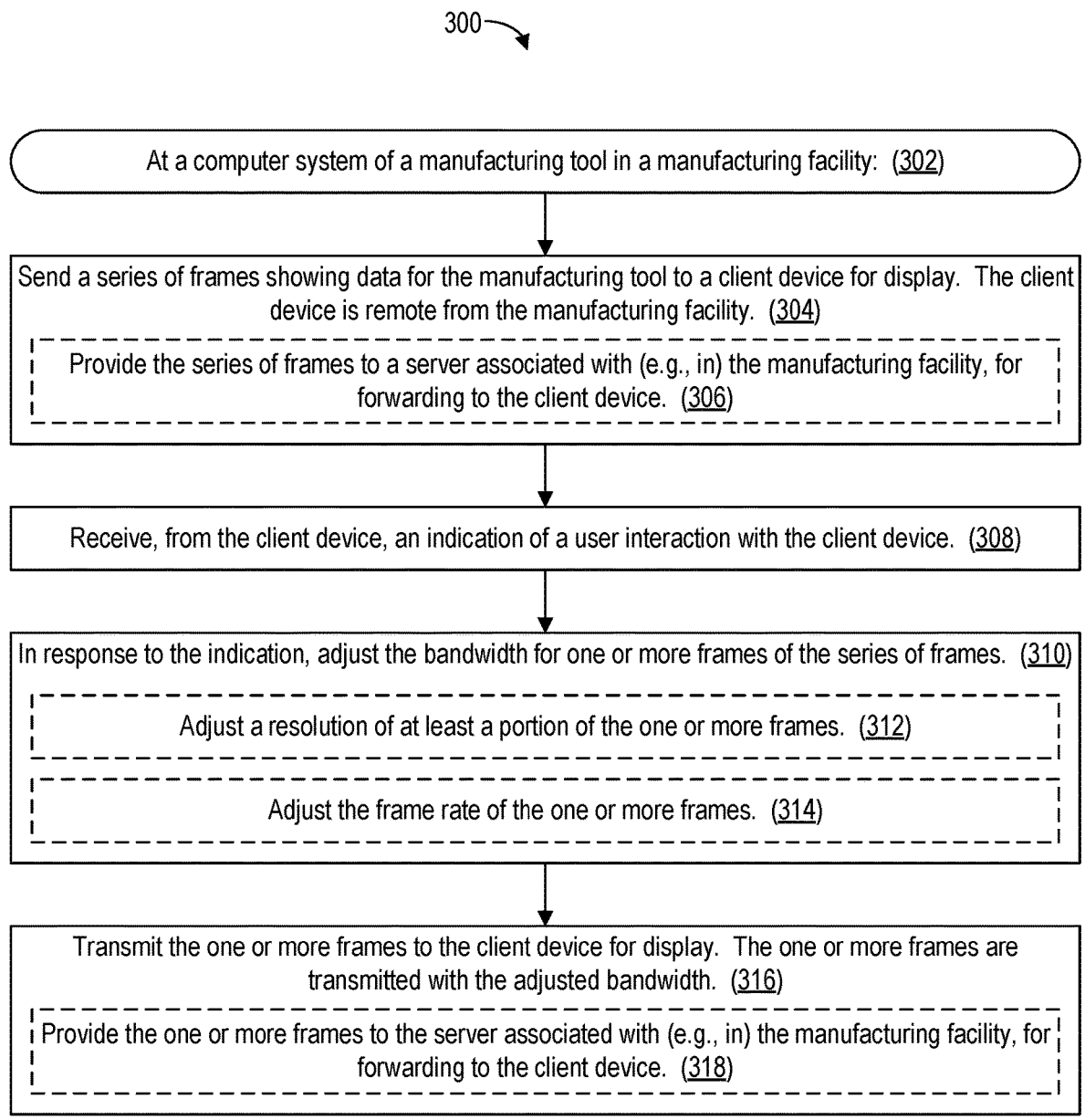
FIG. 3 is a flowchart showing a method for performing bandwidth adjustment for communications from a manufacturing tool to a client device, in accordance with some embodiments.
Figure 8:
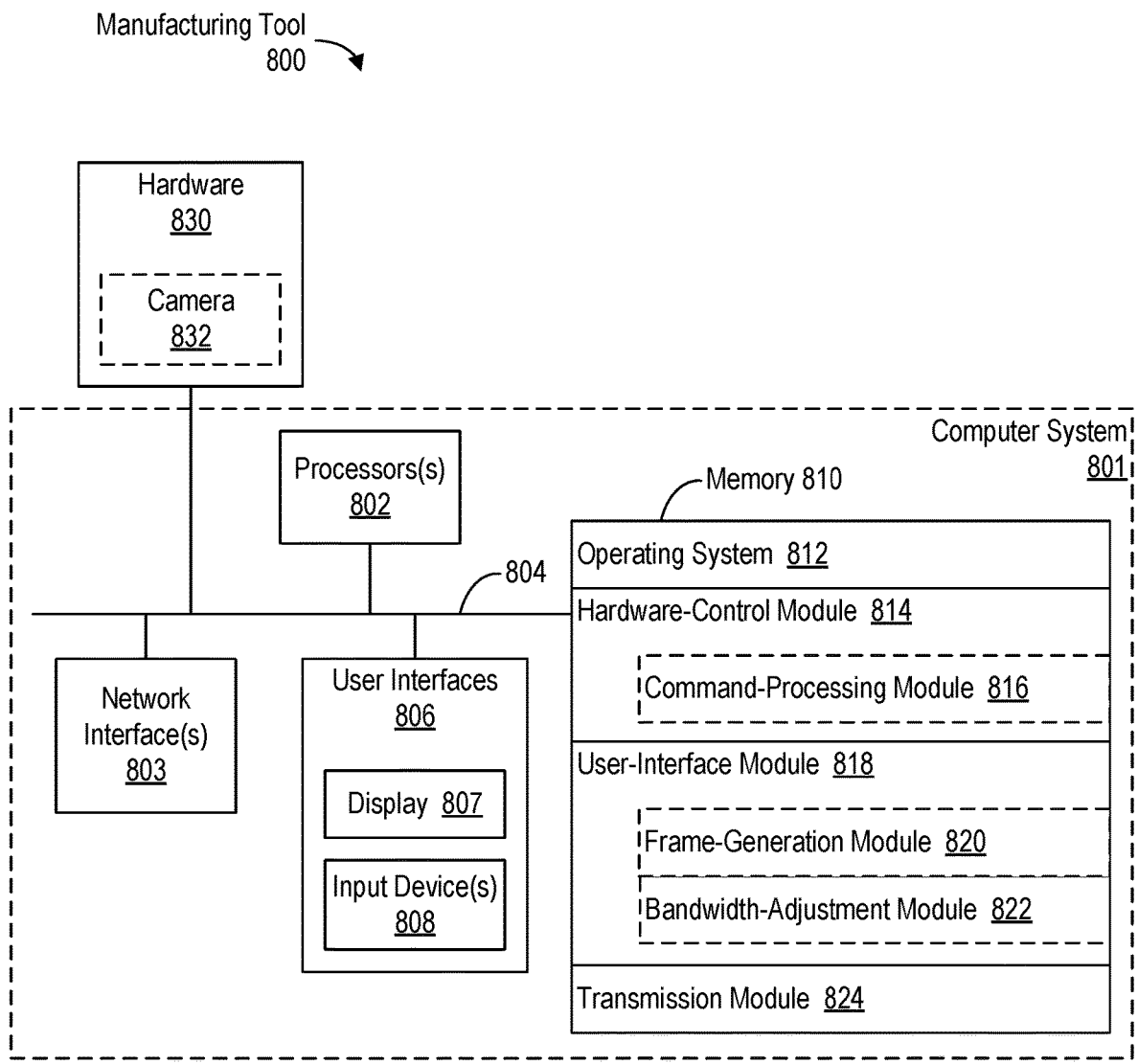
FIG. 8 is a block diagram of a manufacturing tool in accordance with some embodiments.

FIG. 3 is a flowchart showing a method 300 for performing resolution adjustment for communications from a manufacturing tool 124 to a client device 104, in accordance with some embodiments. The method 300 is performed (302) at a computer system of a manufacturing tool 124 in a manufacturing facility 112 (e.g., a manufacturing tool 124 associated with an equipment supplier 102). For example, the method 300 is performed by a computer system 801 of a manufacturing tool 800 (FIG. 8). The method 300 allows bandwidth management for the communications and improves the user experience for the user of the client device 104 (e.g., for an expert providing remote collaboration).

In the method 300, a series of frames is sent (304) showing data for the manufacturing tool 124 to the client device 104 for display. Examples of the data include, without limitation, data regarding a status of the manufacturing tool 124, current operation of the manufacturing tool 124 (e.g., including one or more physical parameters), an operating history of the manufacturing tool 124 (e.g., including one or more physical parameters), and/or results for the manufacturing tool 124. The data may include still images and/or video showing portions of the manufacturing tool 124 (e.g., while idle and/or during operation) and/or a product being processed or tested (e.g., inspected) using the manufacturing tool 124. The client device 104 is remote from the manufacturing facility 112. The client device 104 may be a client device 104 of the equipment supplier 112 for the manufacturing tool 124. In some embodiments, the series of frames is provided (306) to a server 114 associated with (e.g., in) the manufacturing facility 112, for forwarding to the client device 104.

An indication of a user interaction with the client device 104 is received (308) from the client device 104. The indication of the user interaction may be an indication of user input (e.g., as in the example of FIGS. 2A and 2B) or an indication of other user behavior (e.g., as in the eye-tracking example of FIG. 2C). In response to the indication, the bandwidth for one or more frames of the series of frames is adjusted (310). In some embodiments, a resolution of at least a portion of the one or more frames is adjusted (312) and/or a frame rate of the one or more frames is adjusted (314). The one or more frames may be a predefined number of frames. Examples of adjusting the bandwidth are provided below for the methods 400 (FIG. 4), 500 (FIG. 5), and 600 (FIG. 6).

The one or more frames (i.e., the frame(s) with the adjusted resolution) are transmitted (316) to the client device 104 for display. The one or more frames are transmitted with the adjusted bandwidth (i.e., the bandwidth used to transmit the one or more frames is the adjusted bandwidth). In some embodiments, the one or more frames are provided (318) to the server 114 associated with (e.g., in) the manufacturing facility 112, for forwarding to the client device 104. The client device 104 may display the one or more frames, for example as the GUI 202 (FIGS. 2A-2C). If the resolution of the whole frame(s) was adjusted, then the client device 104 will display the whole frame(s) with the adjusted resolution. If the resolution of only a portion of the frame(s) was adjusted, then the client device 104 will display that portion of the frame(s) with the adjusted resolution and display the remainder of the frame(s) with the unadjusted resolution. If the frame rate was adjusted, then the client device 104 may display the one or more frames at the adjusted frame rate.

While transmitting (316) the one or more frames to the client device 104 is shown separately from sending (304) the series of frames to the client device 104, the transmitting of step 316 may be considered part of the sending of step 304: sending (304) the series of frames includes transmitting (316) the one or more frames. The one or more frames transmitted in step 316 thus may be part of the series of frames sent in step 304. Some frames of the series of frames are sent (304) to the client device 104 before receiving the indication of the user interaction with the client device 104, and other frames of the series of frames (including the one or more frames of step 316) are sent (304) to the client device 104 after receiving the indication of the user interaction with the client device 104.

Figure 4:
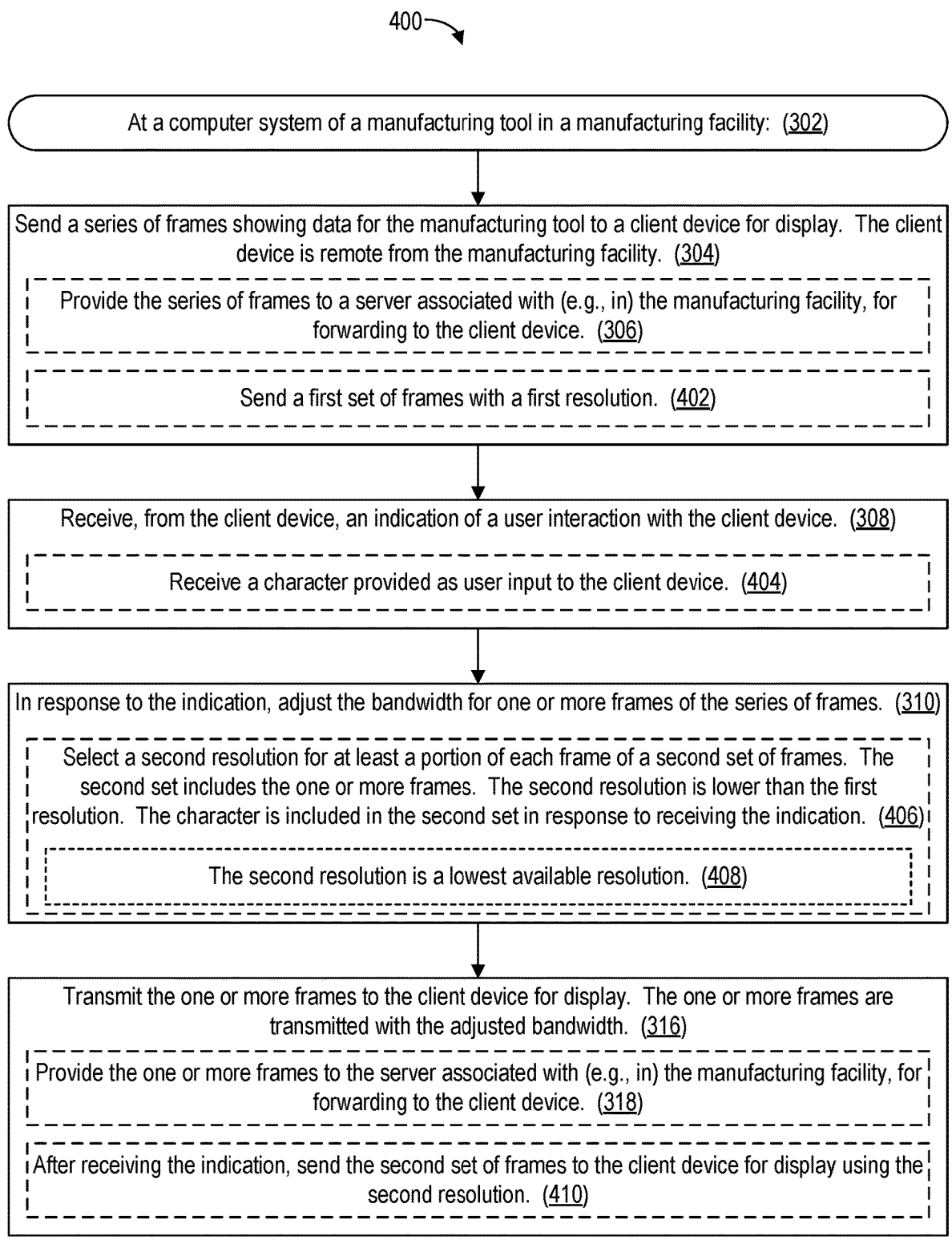
FIGS. 4-6 are flowcharts showing methods that are respective examples of the method of FIG. 3, in accordance with some embodiments.

FIG. 4 is a flowchart showing a method 400 that is an example of the method 300 (FIG. 3), in accordance with some embodiments. In the method 400, sending (304) the series of frames (e.g., providing (306) the series of frames to the server 114 for forwarding to the client device 104) includes sending (402) a first set of frames with a first resolution to the client device 104 for display. The first set of frames is sent before receiving (308) the user interaction.

Receiving (308) the user interaction includes receiving (404) a character provided as user input to the client device 104. For example, FIGS. 2A and 2B illustrate receiving a character (the second "m") that is a portion of a command.

Adjusting (310) the bandwidth of at least a portion of the one or more frames includes adjusting the resolution of the one or more frames by selecting (406) a second resolution for at least a portion of each frame of a second set of frames. The second set includes the one or more frames. The second resolution is lower than the first resolution. The character is included in the second set of frames in response to receiving the indication. In some embodiments, the second resolution is (408) a lowest available resolution.

In some embodiments, the entire frame of each frame of the first set has the first resolution and the entire frame of each frame of the second set has the second resolution. For example, the entire GUI 202 may have the first resolution in FIG. 2A and the second resolution in FIG. 2B.

In some embodiments, the character is a portion of a command for the manufacturing tool 124. Each frame in the second set includes the character. For example, in each frame of the second set, the character is situated in a command line (e.g., command line 204, FIGS. 2A-2C) of a user-interface for the manufacturing tool 124. Adjusting (310) the bandwidth of the one or more frames includes adjusting the resolution of at least a portion of the one or more frames, which may include, for each frame of the second set, maintaining the first resolution for the command line and selecting the second resolution (e.g., the lowest available resolution) for a remainder of the frame outside of the command line. For example, in FIG. 2B the command line 204 may have the first resolution while the remainder of the GUI 202 outside of the command line may have the second resolution. Such a frame may be transmitted quickly in response to a user interaction (e.g., in response to the user inputting the second "m" of FIG. 2B) because the use of the second resolution outside of the command line reduces the frame size. Combining this responsiveness with high resolution for the command line, which may be the area of interest to an expert entering a command, results in a positive user experience for the expert.

Transmitting (316) the one or more frames to the client device 104 (e.g., providing (318) the one or more frames to the server 114 for forwarding to the client device 104) includes sending (410) the second set of frames to the client device 104 for display using the second resolution: the client device 104 will display the one or more frames of the second set using the second resolution either for the entire frame(s) or the specified portions (e.g., the area outside of the command line). The second set is sent to the client device 104 after receiving (308) the user interaction.

In some embodiments, the method 400 further includes selecting the first resolution for a third set of frames that follows the second set. Sending (400) the series of frames (e.g., providing (306) the series of frames to the server 114 for forwarding to the client device 104) further includes sending the third set of frames to the client device 104 for display using the first resolution (e.g., after sending the second set to the client device 104).

Figure 5:
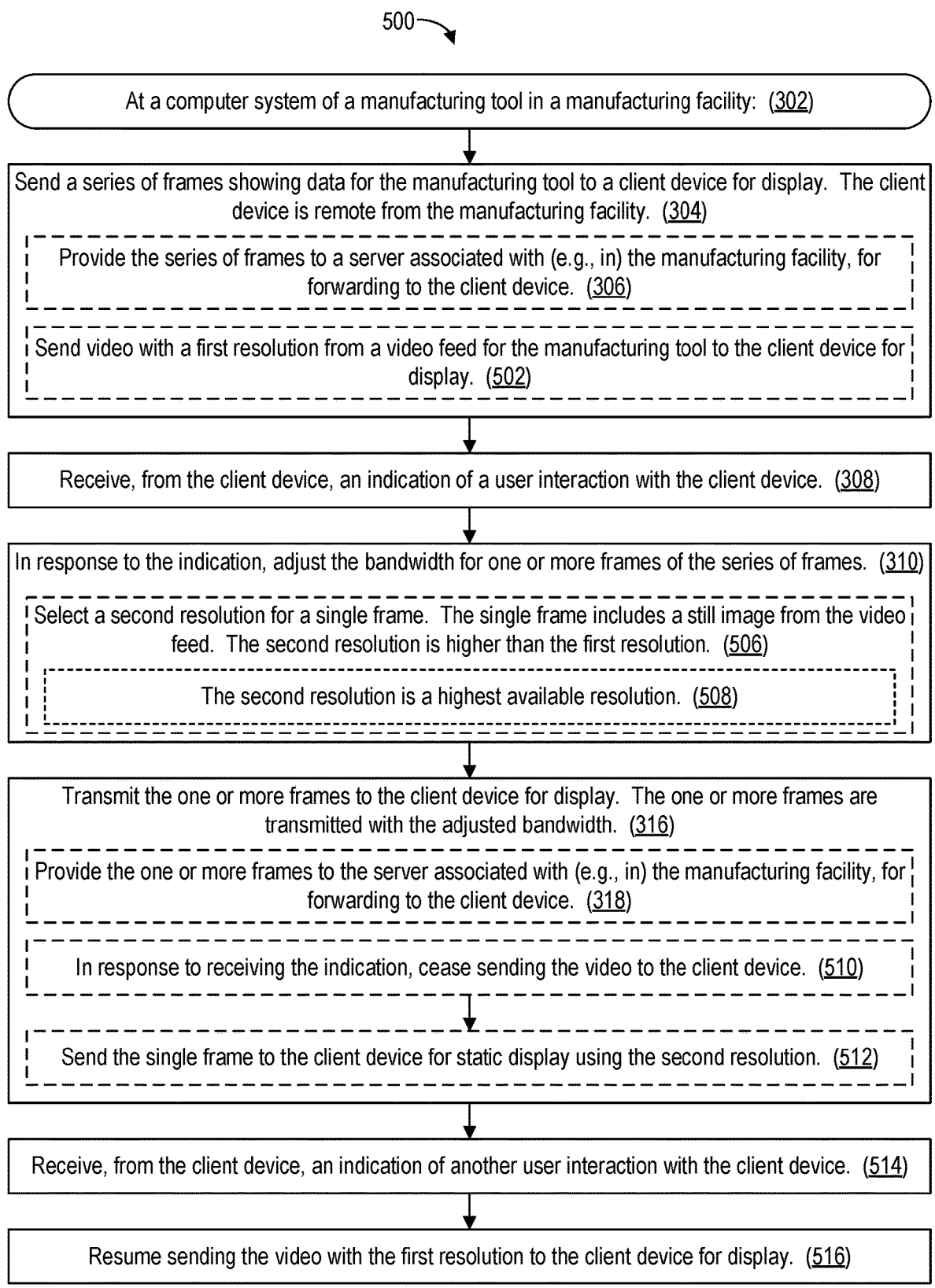
Figure 6:
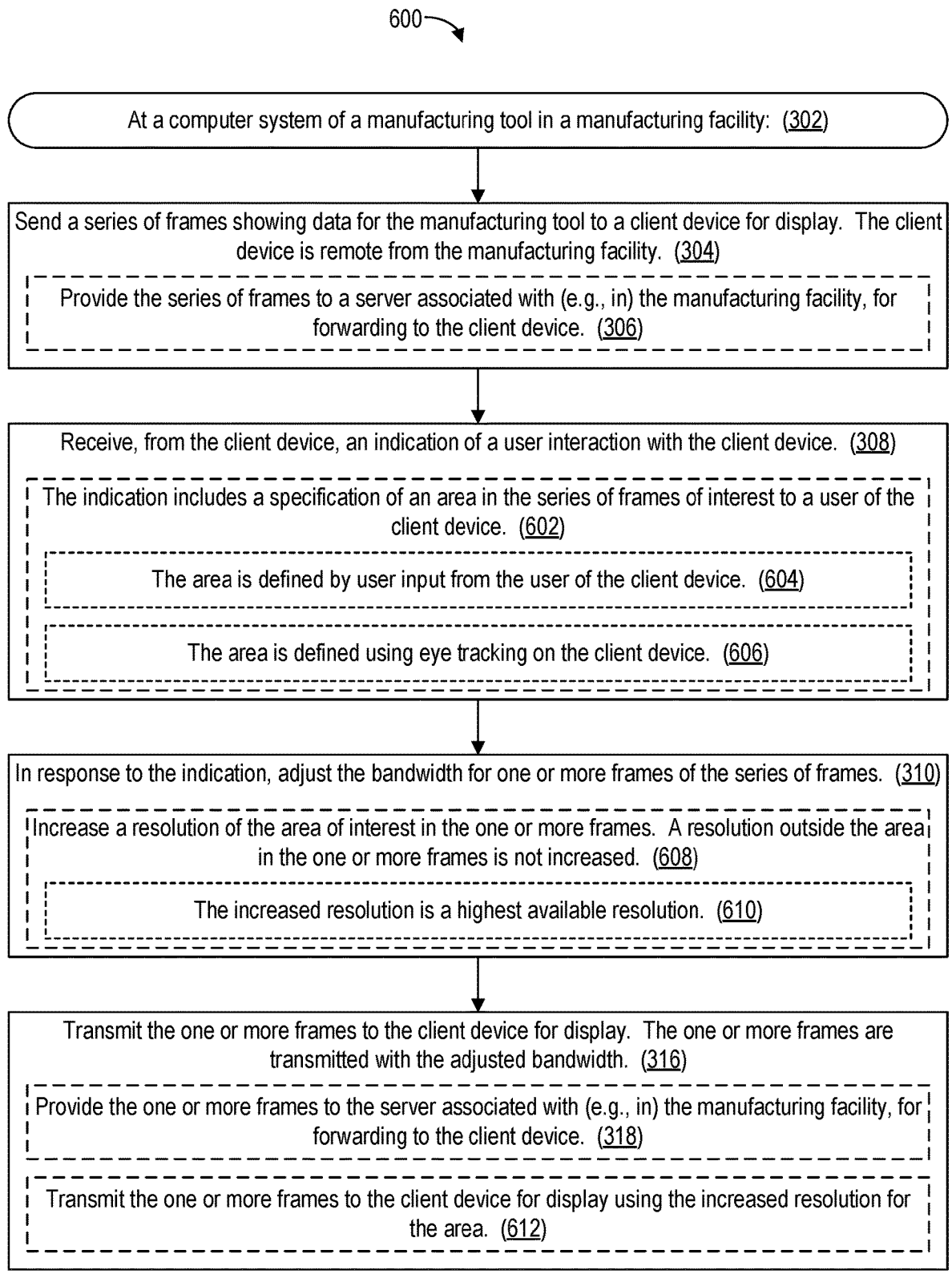

FIG. 5 is a flowchart showing a method 500 that is another example of the method 300 (FIG. 3), in accordance with some embodiments. In the method 500, sending (304) the series of frames (e.g., providing (306) the series of frames to the server 114 for forwarding to the client device 104) includes sending (502) video with a first resolution from a video feed for the manufacturing tool 124 to the client device 104 for display. In some embodiments, the manufacturing tool 124 is an example of the manufacturing tool 800 and the video feed is provided by the camera 832 (FIG. 8). The video may be full-motion video or may have a lower frame rate than full-motion video. The video is sent to the client device 104 before receiving (308) the indication of the user interaction with the client device 104.

In some embodiments, the indication of the user interaction indicates that the user hit a key (e.g., a hot key) on the keyboard 206 (FIGS. 2A-2C) or selected an affordance in the GUI 202 (FIGS. 2A-2C) to pause the video in favor of showing a still image.

Adjusting (310) the bandwidth of the one or more frames includes adjusting the resolution of at least a portion of the one or more frames, which includes selecting (506) a second resolution for a single frame. Adjusting (310) the bandwidth of the one or more frames also includes reducing the frame rate to zero, thus pausing the video. The single frame includes the still image from the video feed. The second resolution is higher than the first resolution. For example, the second resolution is (508) a highest available resolution. The still image may be taken after the video of step 502 has been recorded or may correspond to a frame (e.g., the last frame) of the video of step 502.

In some embodiments, the video and the single frame show at least a portion of the manufacturing tool 124 in operation.

Transmitting (316) the one or more frames to the client device 104 (e.g., providing (318) the one or more frames to the server 114 for forwarding to the client device 104) includes, in response to receiving the indication, ceasing (510) to send the video to the client device 104 and sending (512) the single frame to the client device 104 for static display using the second resolution. The method 500 thus allows the expert to view video in near-real time and also to view an image of interest in high resolution. There may be a delay at the client device 104 between when the video stops and when the single frame is displayed, due to the time taken to generate and transmit the single frame with the second resolution.

The method 500 may further include, after sending (512) the single frame to the client device 104 for static display, receiving (514) from the client device 104 an indication of another user interaction with the client device 104 (i.e., an indication of a second user interaction, whereas the user interaction of step 308 is a first user interaction). For example, the indication of step 308 is an indication of a first user input at the client device 104 and the indication of step 514 is an indication of a second user input at the client device 104. The second user input may be hitting a key (e.g., the hot key) on the keyboard 206 (FIGS. 2A-2C) or selecting an affordance in the GUI 202 (FIGS. 2A-2C) to resume the video. In response, the computer system of the manufacturing tool 124 resumes sending (516) video from the video feed with the first resolution to the client device 104 for display. The second resolution may be too high to allow for smooth playback of the video at the client device 104 (e.g., without dropping frames due to bandwidth and/or memory limitations) and thus is not used for the video, in accordance with some embodiments.

FIG. 6 is a flowchart showing a method 600 that is yet another example of the method 300 (FIG. 3), in accordance with some embodiments. In the method 600, the indication of the user interaction with the client device 104 received in step 308 includes (602) a specification of an area (e.g., area 208, FIG. 2C) in the series of frames that is of interest to a user of the client device 104. In some embodiments, the area is defined (604) by user input (e.g., a click-and-drag operation) from the expert using the client device 104. In some other embodiments, the area is defined (606) using eye tracking on the client device 104. Alternatively, the area is a pre-defined region of a user-interface screen stored by the computer system of the manufacturing tool 124 (e.g., as defined by aggregated information from multiple user inputs) and the indication specifies the user-interface screen (e.g., indicates that the expert has activated the user-interface screen for display).

Adjusting (310) the bandwidth of the one or more frames includes increasing the resolution of at least a portion of the one or more frames, which includes increasing (608) a resolution of the area of interest in the one or more frames. For example, the resolution of the area is increased (610) to a highest available resolution. A resolution outside the area in the one or more frames (e.g., the remainder of the GUI 202 outside the area 208, FIG. 2C) is not increased (e.g., remains the same as in previous frames, or is decreased).

Transmitting (316) the one or more frames to the client device 104 (e.g., providing (318) the one or more frames to the server 114 for forwarding to the client device 104) includes, after receiving the indication, transmitting (612) the one or more frames to the client device 104 for display using the increased resolution for the area.

The methods 400 (FIG. 4), 500 (FIG. 5), and 600 (FIG. 6) may be combined. For example, the computer system of a particular manufacturing tool 124 may perform one or more instances of the method 400, one or more instances of the method 500, and one or more instances of the method 600, in any order.

FIG. 7 is a flowchart showing a method 700 for providing security for communications from a manufacturing tool 124 to a client device 104, in accordance with some embodiments. The method 700 is performed (702) at a computer system of a manufacturing tool 124 in a manufacturing facility 112 (e.g., a manufacturing tool 124 associated with an equipment supplier 102). For example, the method 700 is performed by a computer system 801 of a manufacturing tool 800 (FIG. 8). The computer system is communicatively coupled to a server 114 associated with (e.g., in) the manufacturing facility 112.

In the method 700, a descriptor is assigned (704) to a series of frames showing data for the manufacturing tool 124. The descriptor specifies the type of data in the series of frames.

In some embodiments, the series of frames shows (706) a user interface (e.g., GUI 202, FIGS. 2A-2C) for the computer system of the manufacturing tool 124. The descriptor specifies the user interface. The user interface may include a number of different user-interface screens (e.g., which the user may navigate between using tabs, links, or other affordances), with the series of frames showing different user-interface screens. Respective descriptors may specify respective user-interface screens.

In some embodiments, the series of frames shows (708) one or more values of a physical parameter for the manufacturing tool 124. The descriptor specifies the physical parameter. Examples of the physical parameter include, without limitation, a temperature or a light intensity in the manufacturing tool 124.

In some embodiments, a security classification is assigned (710) to the series of frames (e.g., along with the descriptor). The security classification specifies a level of secrecy (selected from a plurality of secrecy levels) for the series of frames. In addition, or alternatively, a date, time, and/or source identifier may be associated (712) with the series of frames. The source identifier identifies the manufacturing tool 124.

The descriptor is provided (714) to the server 114. If a security classification was assigned (710) to the series of frames, the security classification may be provided (716) to the server 114. If a date, time, and/or source identifier were associated (712) with the series of frames, the date, time, and/or source identifier may be provided (718) to the server 114.

The series of frames is provided (720) to the server 114 for forwarding to the client device 104, which is remote from the manufacturing facility. The server 114 forwards the series of frames to the client device 104 in accordance with a decision, based at least in part on the descriptor, that the client device 104 is authorized to receive the series of frames. If the security classification was provided (716) to the server 114, the decision may be further based (722), at least in part, on the security classification. If the date, time, and/or source identifier were provided (718) to the server 114, the decision may be further based (724), at least in part, on the date, time, and source identifier. In some embodiments, the decision is made by performing a look-up in a look-up table (e.g., in security module 914, FIG. 9) that stores permissions as a function of descriptor, security classification, date, time, source identifier, equipment supplier, client device, and/or other variables.

In some embodiments, the frames, descriptor, security classification, date, time, and/or source identifier are provided to the server 114 in data packages in a self-describing format. For example, the data packages may use JavaScript Object Notation (JSON) format or HyperText Markup Language format.

Having the server 114 instead of the computer system of the manufacturing tool 124 decide whether the client device 104 is authorized to receive the frames reduces the computational load on the computer system of the manufacturing tool 124 (e.g., allowing it to be lightweight). Making the decision using information from the computer system of the manufacturing tool 124 allows for end-to-end security.

The method 300 (FIG. 3) (e.g., the method 400, FIG. 4; 500, FIG. 5; or 600, FIG. 6) may be combined with the method 700 (FIG. 7). For example, providing (306, FIGS. 3-6) the series of frames to the server 114, including providing (318, FIGS. 3-6) the one or more frames to the server 114, is performed in accordance with step 720 (FIG. 7): the server 114 forwards the series of frames to the client device 104 in accordance with the decision that the client device 104 is authorized to receive the series of frames.

FIG. 8 is a block diagram of a manufacturing tool 800 in accordance with some embodiments. The manufacturing tool 800, which is an example of a manufacturing tool 124 in a manufacturing facility 112 (FIG. 1), includes hardware 830 and a computer system 801. The hardware 830 processes or inspects products (e.g., semiconductor wafers) being fabricated in the manufacturing facility 112. The computer system 801 controls the hardware 830 and reports on the status of the hardware 830. The hardware 830 may include a camera 832 positioned to provide images (e.g., a video feed) of a portion of the hardware 830.

The computer system 801 includes one or more processors 802 (e.g., CPUs), user interfaces 806, memory 810, one or more network interfaces 803, and communication bus(es) 804 interconnecting these components. The network interfaces 803 are used for communicating via the network 119 (FIG. 1). The user interfaces 806 may include a display 807 and one or more input devices 808 (e.g., a keyboard, mouse, touch-sensitive surface of the display 807, etc.). The display 807 may display graphical user interfaces for the manufacturing tool 800.

Memory 810 includes volatile and/or non-volatile memory. Memory 810 (e.g., the non-volatile memory within memory 810) includes a non-transitory computer-readable storage medium. Memory 810 optionally includes one or more storage devices remotely located from the processors 802 and/or a non-transitory computer-readable storage medium that is removably inserted into the computer system 801. In some embodiments, memory 810 (e.g., the non-transitory computer-readable storage medium of memory 810) stores the following modules and data: an operating system 812, a hardware-control module 814 for controlling the hardware 830, a user-interface module 818 for generating a user interface (e.g., GUI 202, FIGS. 2A-2C) and corresponding frames, and a transmission module 824 for sending the frames. The hardware-control module 814 includes a command-processing module 816 for processing commands received from client devices 104. The user-interface module 818 includes a frame-generation module 820 for generating the frames and a bandwidth-adjustment module 822 for adjusting the bandwidth of the frames (e.g., for setting the resolution of the frames or portions thereof and/or for setting the frame rate). The frame-generation module 820 may assign a descriptor to frames, assign a security classifier to frames, and/or associate a date, time, and/or source identifier with frames.

The memory 810 (e.g., the non-transitory computer-readable storage medium) stores instructions for performing the method 300 (FIG. 3) (e.g., the methods 400, FIG. 4; 500, FIG. 5; and/or 600, FIG. 6) and/or the method 700 (FIG. 7). Each of the modules stored in the memory 810 corresponds to a set of instructions for performing one or more functions described herein. Separate modules need not be implemented as separate software programs. The modules and various subsets of the modules may be combined or otherwise re-arranged. In some embodiments, the memory 810 stores a subset or superset of the modules and/or data structures identified above.

FIG. 8 is intended more as a functional description of various features that may be present in a manufacturing tool and its computer system than as a structural schematic. For example, the functionality of the computer system 801 may be split between multiple devices. A portion of the modules stored in the memory 810 may alternatively be stored in one or more other computer systems communicatively coupled with the computer system 801 through one or more networks.

Figure 9:
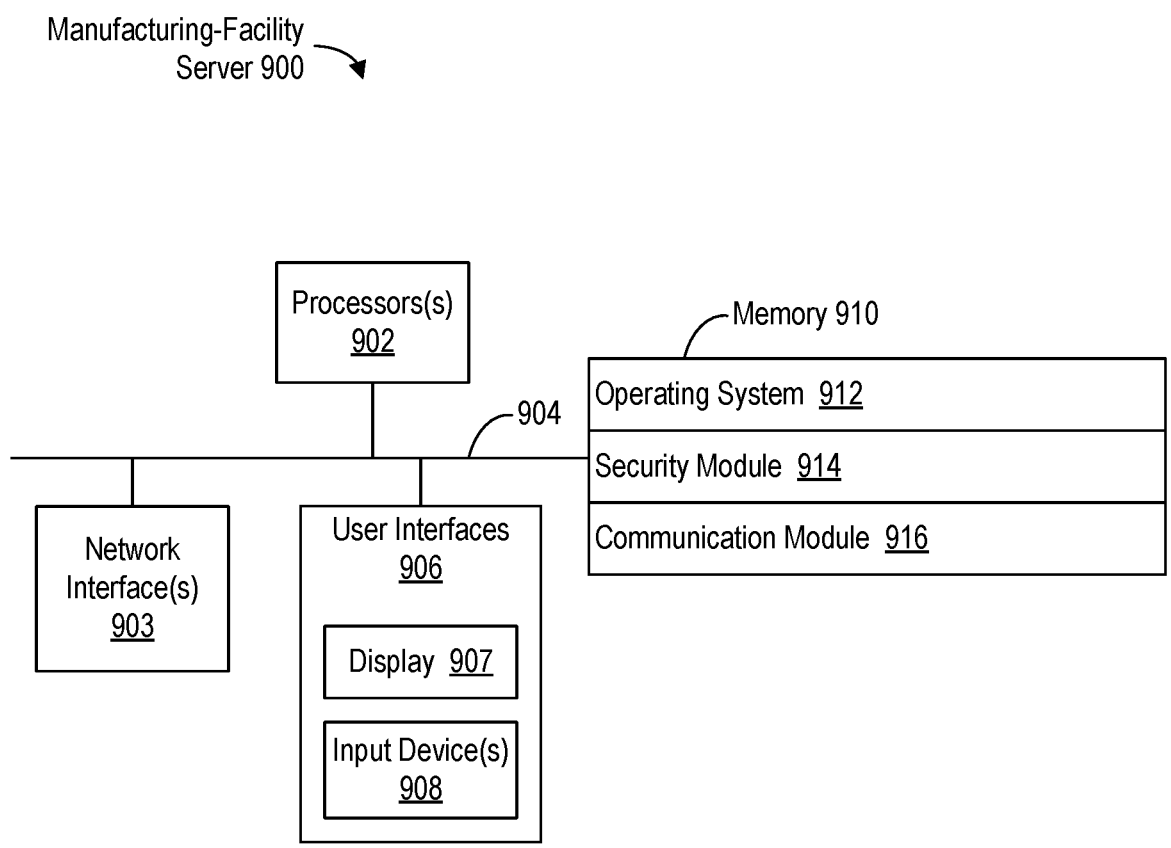
FIG. 9 is a block diagram of a manufacturing-facility server, in accordance with some embodiments.

FIG. 9 is a block diagram of a manufacturing-facility server 900, in accordance with some embodiments. The server 900 is an example of a server 114 associated with (e.g., in) a manufacturing facility 112 (FIG. 1). The server 900 includes one or more processors 902 (e.g., CPUs), user interfaces 906, memory 910, one or more network interfaces 903, and communication bus(es) 904 interconnecting these components. The one or more network interfaces 903 are used for communicating via the Internet 110 and/or the network 119 (FIG. 1). The user interfaces 906 may include a display 907 and one or more input devices 908 (e.g., a keyboard, mouse, touch-sensitive surface of the display 907, etc.). The display 907 may display graphical user interfaces regarding remote support activities and corresponding requests, connections, and transmissions.

Memory 910 includes volatile and/or non-volatile memory. Memory 910 (e.g., the non-volatile memory within memory 910) includes a non-transitory computer-readable storage medium. Memory 910 optionally includes one or more storage devices remotely located from the processors 902 and/or a non-transitory computer-readable storage medium that is removably inserted into the server 900. The memory 910 (e.g., the non-transitory computer-readable storage medium of the memory 910) includes instructions for performing all or a portion of the method 300 (FIG. 3). In some embodiments, memory 910 (e.g., the non-transitory computer-readable storage medium of memory 910) stores the following modules and data: an operating system 912, a security module 914 for authorizing communications between manufacturing tools 124 and remote client devices 104, and a communication module 916 for transmitting and receiving communications (e.g., for manufacturing tools 124 and client devices 104). The memory 910 (e.g., the security module 914) stores instructions (e.g., in the non-transitory computer-readable storage medium) for making the decision of step 720 (e.g., including steps 722 and/or 724) in the method 700 (FIG. 7).

Each of the modules stored in the memory 910 corresponds to a set of instructions for performing one or more functions described herein. Separate modules need not be implemented as separate software programs. The modules and various subsets of the modules may be combined or otherwise re-arranged. In some embodiments, the memory 910 stores a subset or superset of the modules and/or data structures identified above.

FIG. 9 is intended more as a functional description of various features that may be present in a server than as a structural schematic. For example, the functionality of the server 900 may be split between multiple devices. A portion of the modules stored in the memory 910 may alternatively be stored in one or more other computer systems communicatively coupled with the server 900 through one or more networks.

Figure 10:
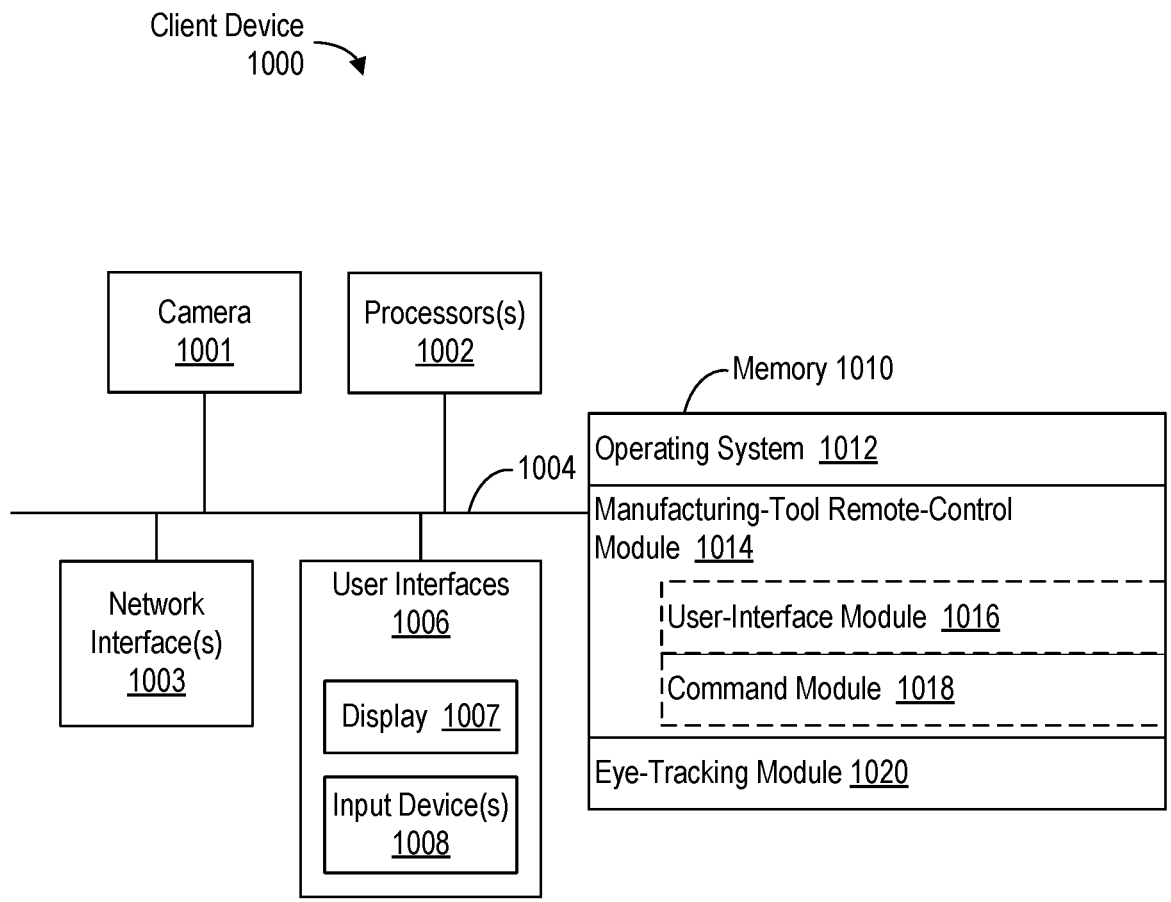
FIG. 10 is a block diagram of a client device, in accordance with some embodiments.

FIG. 10 is a block diagram of a client device 1000, in accordance with some embodiments. The client device 1000 may be an example of a client device 104 of an equipment supplier 102. The client device 1000 includes one or more processors 1002 (e.g., CPUs), user interfaces 1006, memory 1010, one or more network interfaces 1003, and communication bus(es) 1004 interconnecting these components. The one or more network interfaces 1003 are used for communicating via one or more networks (e.g., the Internet 110 and/or the network 106, FIG. 1). The client device may also include a camera 1001 (e.g., camera 122, FIGS. 1-2C) interconnected with other components by the communication bus(es) 1004. The user interfaces 1006 may include a display 1007 (e.g., display screen 200, FIGS. 2A-2C) and one or more input devices 1008 (e.g., a keyboard 206, FIGS. 2A-2C; mouse; touch-sensitive surface of the display 1007; etc.). The display 1007 may display graphical user interfaces (e.g., GUI 202, FIGS. 2A-2C) regarding remote support activities for manufacturing tools 124 (FIG. 1) (e.g., manufacturing tools 800, FIG. 8).

Memory 1010 includes volatile and/or non-volatile memory. Memory 1010 (e.g., the non-volatile memory within memory 1010) includes a non-transitory computer-readable storage medium. Memory 1010 optionally includes one or more storage devices remotely located from the processors 1002 and/or a non-transitory computer-readable storage medium that is removably inserted into the client device 1000. In some embodiments, memory 1010 (e.g., the non-transitory computer-readable storage medium of memory 1010) stores the following modules and data: an operating system 1012; a manufacturing-tool remote-control module 1014 for interacting with a remote manufacturing tool 124, and an eye-tracking module 1020 for determining areas (e.g., the area 208, FIG. 2C) on the display 1007 that the user looks at. The manufacturing-tool remote-control module 1014 may include a user-interface module 1016 for displaying a user interface (e.g., GUI 202, FIGS. 2A-2C, as received in frames from the computer system of the manufacturing tool 124) and a command module 1018 for receiving commands from the user (i.e., expert) and sending the commands to the computer system of the manufacturing tool 124.

Each of the modules stored in the memory 1010 corresponds to a set of instructions for performing one or more functions described herein. Separate modules need not be implemented as separate software programs. The modules and various subsets of the modules may be combined or otherwise re-arranged. In some embodiments, the memory 1010 stores a subset or superset of the modules and/or data structures identified above.

FIG. 10 is intended more as a functional description of various features that may be present in a client device than as a structural schematic. For example, the functionality of the client device 1000 may be split between multiple devices. A portion of the modules stored in the memory 1010 may alternatively be stored in one or more other computer systems communicatively coupled with the client device 1000 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer-readable storage medium storing one or more programs for execution by one or more processors of a computer system, the one or more programs comprising instructions for:
sending a series of frames showing data for a manufacturing tool to a client device for display, wherein the client device is remote from a manufacturing facility in which the manufacturing tool is to be disposed; and
in response to receiving, from the client device, an indication of a user interaction with the client device, the indication comprising a character provided as user input to the client device, adjusting a bandwidth for one or more frames of the series of frames; wherein:
the instructions for sending the series of frames comprise instructions for sending a first set of frames with a first resolution, before receiving the indication;
the instructions for adjusting the bandwidth comprise instructions for selecting a second resolution for at least a portion of each frame of a second set of frames comprising the one or more frames, the second resolution being lower than the first resolution, the character being included in the second set of frames in response to receiving the indication; and
the instructions for sending the series of frames further comprise instructions for transmitting, after receiving the indication, the one or more frames with the adjusted bandwidth to the client device for display, the instructions for transmitting the one or more frames comprising instructions for sending the second set of frames to the client device for display using the second resolution, after receiving the indication.

2. The computer-readable storage medium of claim 1, wherein:
the manufacturing tool is associated with an equipment supplier; and
the client device is a client device of the equipment supplier.

3. The computer-readable storage medium of claim 1, wherein the second resolution is a lowest available resolution.

4. The computer-readable storage medium of claim 1, wherein:
for each frame of the first set, the entire frame has the first resolution; and
for each frame of the second set, the entire frame has the second resolution.

5. The computer-readable storage medium of claim 1, wherein:
the character is a portion of a command for the manufacturing tool; and
each frame in the second set includes the character.

6. The computer-readable storage medium of claim 5, wherein each frame in the second set includes the character in a command line of a user interface for the manufacturing tool.

7. The computer-readable storage medium of claim 6, wherein the instructions for adjusting the bandwidth comprise, for each frame of the second set, instructions for:
maintaining the first resolution for the command line; and
selecting the second resolution for a remainder of the frame outside of the command line.

8. The computer-readable storage medium of claim 7, wherein the second resolution is a lowest available resolution.

9. The computer-readable storage medium of claim 1, the one or more programs further comprising instructions for selecting the first resolution for a third set of frames that follows the second set;
wherein the instructions for sending the series of frames further comprise instructions for sending the third set of frames to the client device for display using the first resolution, after sending the second set.

10. The computer-readable storage medium of claim 1, wherein:
the computer system is a computer system of the manufacturing tool;
the computer system of the manufacturing tool is communicatively coupled to a server associated with the manufacturing facility; and
the instructions for sending the series of frames comprise instructions for providing the series of frames to the server for forwarding to the client device.

11. A computer system, comprising:
one or more processors; and
memory storing one or more programs for execution by the one or more processors, the one or more programs comprising instructions for:
sending a series of frames showing data for a manufacturing tool to a client device for display, wherein the client device is remote from a manufacturing facility in which the manufacturing tool is to be disposed; and
in response to receiving, from the client device, an indication of a user interaction with the client device, the indication comprising a character provided as user input to the client device, adjusting a bandwidth for one or more frames of the series of frames; wherein:
the instructions for sending the series of frames comprise instructions for sending a first set of frames with a first resolution, before receiving the indication;
the instructions for adjusting the bandwidth comprise instructions for selecting a second resolution for at least a portion of each frame of a second set of frames comprising the one or more frames, the second resolution being lower than the first resolution, the character being included in the second set of frames in response to receiving the indication; and
the instructions for sending the series of frames further comprise instructions for transmitting, after receiving the indication, the one or more frames with the adjusted bandwidth to the client device for display, the instructions for transmitting the one or more frames comprising instructions for sending the second set of frames to the client device for display using the second resolution, after receiving the indication.

* * * * *